United States Patent
Pathirakani et al.

(10) Patent No.: US 12,430,269 B2
(45) Date of Patent: Sep. 30, 2025

(54) MULTI-FUNCTIONAL UNIVERSAL SERIAL BUS (USB) DRIVE

(71) Applicant: SANDISK TECHNOLOGIES, INC., Milpitas, CA (US)

(72) Inventors: Ganesh Kumar Pathirakani, Tamilnadu (IN); Venkatesh Ramadoss, Tamilnadu (IN); Nagarajan Ragupathy, Karnataka (IN); Sashavalli Maniyar, Karnataka (IN)

(73) Assignee: Sandisk Technologies, Inc., Milpitas, CA (US)

(*) Notice: Subject to any disclaimer, the term of this patent is extended or adjusted under 35 U.S.C. 154(b) by 15 days.

(21) Appl. No.: 18/499,863

(22) Filed: Nov. 1, 2023

(65) Prior Publication Data

US 2025/0139039 A1    May 1, 2025

(51) Int. Cl.
*G06F 13/10*  (2006.01)
*G06F 13/16*  (2006.01)
*G06F 13/38*  (2006.01)

(52) U.S. Cl.
CPC ........ *G06F 13/387* (2013.01); *G06F 13/1668* (2013.01)

(58) Field of Classification Search
CPC .......................... G06F 13/387; G06F 13/1668
See application file for complete search history.

(56) References Cited

U.S. PATENT DOCUMENTS

| | | | | |
|---|---|---|---|---|
| 7,391,607 B2* | 6/2008 | Minami | ............... | G06F 1/187 |
| | | | | 361/679.33 |
| 7,506,191 B2* | 3/2009 | Liang | ............... | G06F 1/32 |
| | | | | 713/323 |
| 7,614,566 B2* | 11/2009 | Shin | ............... | G06K 19/07 |
| | | | | 235/441 |
| 7,683,932 B2* | 3/2010 | Ono | ............... | G06F 3/0607 |
| | | | | 348/207.99 |
| 7,969,471 B2* | 6/2011 | Fujita | ............... | H04N 23/661 |
| | | | | 348/211.3 |
| 8,595,523 B2* | 11/2013 | Ko | ............... | G06F 1/3225 |
| | | | | 713/320 |
| 8,677,069 B2* | 3/2014 | Okabayashi | ........ | G06F 13/385 |
| | | | | 711/115 |
| 8,769,160 B2* | 7/2014 | Park | ............... | G06F 13/387 |
| | | | | 710/14 |
| 9,442,877 B2* | 9/2016 | Sasaki | ............... | G06F 15/17 |

(Continued)

FOREIGN PATENT DOCUMENTS

CN    201417612 Y    3/2010
CN    201550370 U    8/2010

*Primary Examiner* — Cheng Yuan Tseng
(74) *Attorney, Agent, or Firm* — Patterson + Sheridan, LLP

(57) ABSTRACT

A multi-function universal serial bus (USB) device may include a plurality of USB interfaces, including a first USB interface and a second USB interface. The USB device may include a plurality of memories including a first memory and a second memory. The USB device may include a controller coupled to the first memory and the second memory, the controller configured to: identify which one of the first USB interface and the second USB interface is coupled to a host device; and perform operations on one of the first memory or the second memory based on which one of the first USB interface and the second USB interface is identified to be coupled to the host device.

18 Claims, 6 Drawing Sheets

(56) References Cited

U.S. PATENT DOCUMENTS

| | | | |
|---|---|---|---|
| 10,244,128 B2* | 3/2019 | Kawaguchi | H04N 1/00891 |
| 11,513,978 B2 | 11/2022 | Bommana et al. | |
| 2003/0212848 A1 | 11/2003 | Liu et al. | |
| 2005/0223145 A1* | 10/2005 | Lin | G06F 8/63 |
| | | | 710/62 |
| 2006/0047982 A1* | 3/2006 | Lo | G06F 1/266 |
| | | | 713/300 |
| 2007/0299996 A1* | 12/2007 | Guy | G06F 13/385 |
| | | | 710/63 |
| 2010/0025480 A1* | 2/2010 | Nishizawa | G06K 19/077 |
| | | | 235/492 |
| 2010/0251543 A1* | 10/2010 | Hoang | H05K 1/117 |
| | | | 29/832 |
| 2012/0159008 A1* | 6/2012 | Park | G06F 13/387 |
| | | | 710/15 |
| 2014/0063943 A1* | 3/2014 | Nagashima | G11C 16/12 |
| | | | 365/185.23 |
| 2014/0281139 A1 | 9/2014 | Smurthwaite | |
| 2015/0261696 A1* | 9/2015 | Christian | G06F 13/105 |
| | | | 703/25 |
| 2022/0308769 A1 | 9/2022 | Muthiah et al. | |

* cited by examiner

MULTI-FUNCTIONAL UNIVERSAL SERIAL BUS (USB) DRIVE

BACKGROUND

Field

This disclosure is generally related to electronic devices and more particularly to storage devices.

INTRODUCTION

With the continuous advancement of technology, electronic information devices such as personal computers, digital cameras/camcorders, music/video players, tablets, iPods, iPads, smart phones, and the like have become popular. With this advancement in technology and the associated use of these devices came a corresponding increased use of digital data that includes user information, news information, music, TV shows, movies, pictures, videos, etc. Each of these devices may contain one or more different types of digital data, and users often want to share the digital data between multiple devices. However, many of these devices also have different specifications and sizes, including for the interfaces that they support. A large device, such as a personal computer, can have an interface that uses a large connector such as a standard universal serial bus (USB) connector. A small device, such as a camera, can have a smaller connector, such as a mini-USB or micro-USB connector. Moreover, such devices and connectors may be configured to support different protocols for data transfer and different storage types, both of which may affect data transfer rates and digital storage capacity. These different interfaces, protocols, and storage types may not only increase the difficulty of sharing digital data among these devices but may also require a user to purchase several different storage devices to facilitate data sharing and accommodate the different interfaces, protocols, and types of the user's devices.

SUMMARY

In some aspects, the techniques described herein relate to a storage device, including: a plurality of universal serial bus (USB) interfaces, including a first USB interface and a second USB interface; a plurality of memories including a first memory and a second memory; and a controller coupled to the first memory and the second memory, the controller configured to: identify which one of the first USB interface and the second USB interface is coupled to a host device; and perform operations on one of the first memory or the second memory based on which one of the first USB interface and the second USB interface is identified to be coupled to the host device.

In some aspects, the techniques described herein relate to a method for storing data at a storage device, including: connecting a first universal serial bus (USB) interface of the storage device to a host device, wherein the storage device includes a plurality of USB interfaces including the first USB interface and a plurality of memories including a first memory corresponding to the first USB interface; detecting that the first USB interface is coupled to the host device; and performing operations on the first memory based on the first USB interface being detected to be coupled to the host device.

In some aspects, the techniques described herein relate to a non-transitory, computer-readable medium including computer executable code, the code when executed by one or more processors causes the one or more processors to, individually or in combination: detect that a first universal serial bus (USB) interface is coupled to a host device, wherein the first USB interface is one of a plurality of USB interfaces corresponding to a first memory of a plurality of memories; and perform operations on the first memory based on the first USB interface being detected to be coupled to the host device.

In some aspects, the techniques described herein relate to a storage device comprising: means for detecting that a first universal serial bus (USB) interface is coupled to a host device, wherein the first USB interface is one of a plurality of USB interfaces corresponding to a first memory of a plurality of memories; and means for performing operations on the first memory based on the first USB interface being detected to be coupled to the host device.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
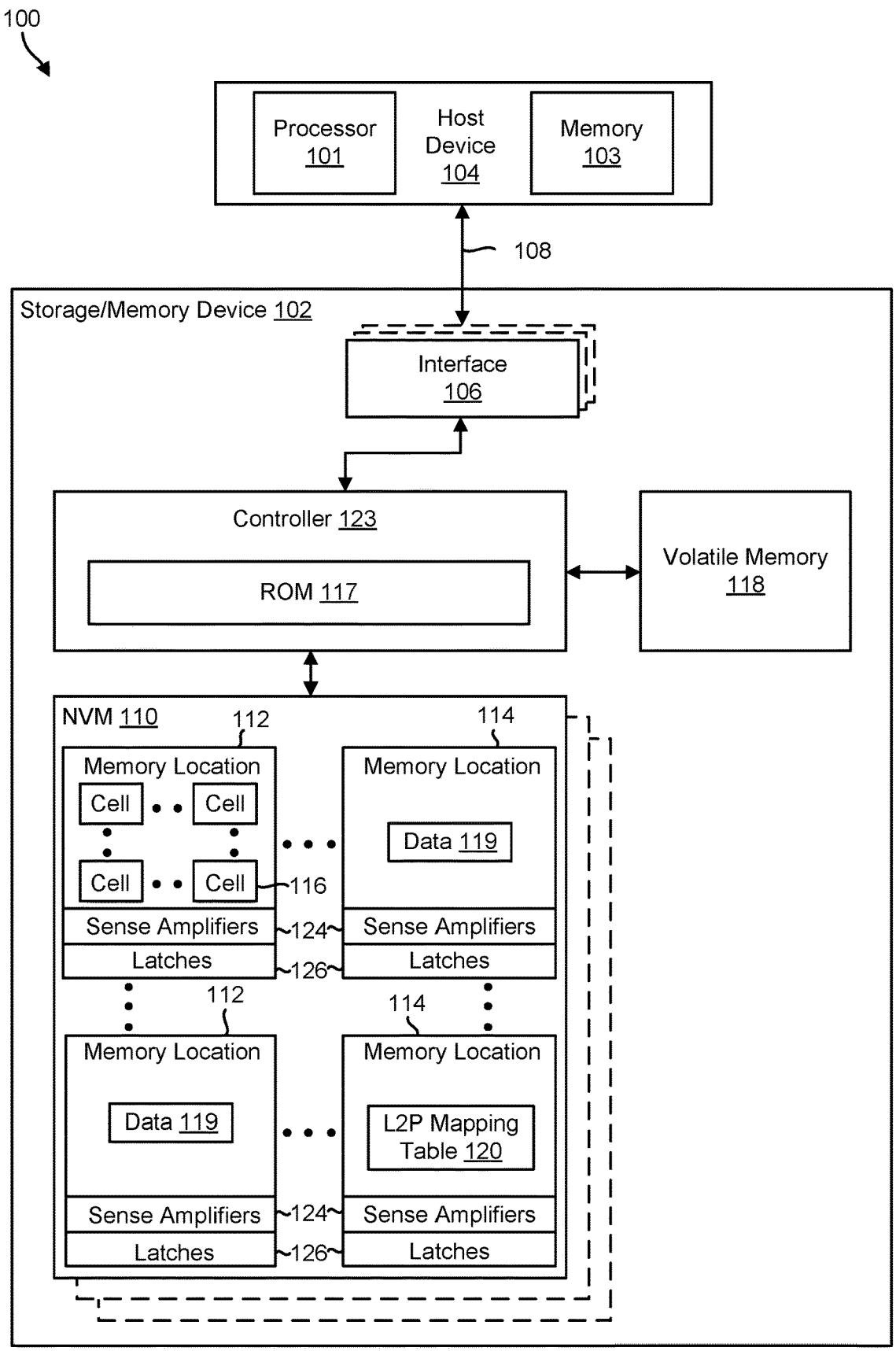
FIG. 1 is a block diagram illustrating an exemplary embodiment of a storage device (e.g., a multi-function universal serial bus (USB) device) in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as universal serial bus (USB) devices. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Aspects of the disclosure relate to non-volatile memory drives, particularly universal serial bus (USB) drives. USB drives provide a non-volatile memory for use in numerous flash memory applications across a broad spectrum of electronic devices. For example, in consumer and industrial electronics, a USB drive may provide a user with a means for transferring digital data from one computing device to another. USB drives use a standardized interface (e.g., type-A interface, type-B interface, type-C interface) with standard, mini, and micro sizes, any of which may also use different protocols.

As such, each USB drive may be defined within a broad range of configurations. For example, a first USB drive may be configured with a high-capacity non-volatile memory but may be limited to a slow data rate. Thus, the first USB drive may not be suitable for applications where a high data rate transfer is required. In another example, a second USB drive may be configured with a relatively low-capacity non-volatile memory but include an ability for relatively higher data rates. Here, the second USB drive may not have a suitable for a scenario requiring a greater capacity for storage. Similarly, different scenarios may require that a particular USB interface (e.g., standard, mini, or micro) is used on one host device while another USB interface is used on another host device, or where a first protocol (e.g., USB2.0) is required for one host device and a second protocol (e.g., USB3.2) is required for another host device.

As such, a user that would like to take advantage of multiple metrics (e.g., higher data transfer rates and high capacity, differently sized interfaces, and/or different protocols) may need to purchase and carry two separate USB drives.

Certain aspects are directed to a USB device that includes multiple separate flash memories arranged within a single USB device (e.g., a single USB enclosure), with each of the multiple separate flash memories having a separate USB interface coupled to the same controller. Thus, a single USB device may include different flash memories, different USB interfaces, and/or different protocols that the user may use for different host devices depending on a particular need. Accordingly, the user may access and use each of the separate flash memories separately via one USB interface at a time using the same controller. Using the same controller and same enclosure for multiple different memories and USB interfaces in a single USB device may reduce costs associated with the manufacture of the USB device, and thus, may cost less than buying multiple different USB drives. Moreover, the user may still make use of the same USB device in scenarios where one of the multiple flash memories is corrupted, but another flash memory is still functional.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

The storage device 102, in various embodiments, may be disposed in one or more different locations relative to the host 104. In one embodiment, the storage device 102 includes one or more non-volatile memories (NVMs) 110, such as semiconductor chips or packages or other integrated circuit devices disposed on one or more printed circuit boards, storage housings, and/or other mechanical and/or electrical support structures. For example, the storage device 102 may comprise one or more dual inline memory module (DIMM) cards, one or more expansion cards and/or daughter cards, a solid-state-drive (SSD) or other hard drive device, and/or may have another memory and/or storage form factor. The storage device 102 may be integrated with and/or mounted on a motherboard of the host 104, installed in a port and/or slot of the host 104, installed on a different host 104 and/or a dedicated storage appliance on bus/network 108, in communication with the host 104 via an external bus (e.g., a universal serial bus (USB)) connection, or the like. In such an example, the storage device may be implemented as an external storage device.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random-access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

An interface 106 is configured to interface the storage device 102 with the host 104 via a universal serial bus (USB) interface, bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g., 5G NR, 4G LTE, 3G, 2G, GSM/UMTS, CDMA One/CDMA2000, etc.), wireless distribution methods through access points (e.g., IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies. In certain aspects, the storage device 102 may include multiple host interfaces, such as multiple USB interfaces. As described in greater detail below, each of the multiple USB interfaces may have a corresponding USB configuration that is different from other of the multiple USB interfaces (e.g., a first USB interface may be configured for a particular NAND type, a protocol type, and/or a USB interface type).

The storage device 102 includes a memory. For example, in the exemplary embodiment of FIG. 1, the one or more NVMs 110 may be used by the storage device 102 for persistent storage of data received from the host 104. The NVM 110 can include, for example, flash integrated circuits, NAND memory (e.g., three-dimensional (3D) NAND, single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of NVM memory locations 112 which may store system data for operating the storage device 102 or user data received from the host for storage in the storage device 102. For example, the NVM may have a cross-point architecture including a two-dimensional (2D) NAND array of NVM memory locations 112 having n rows and m columns, where m and n are predefined according to the size of the NVM. In the exemplary embodiment of FIG. 1, each NVM memory location 112 may be a die 114 including multiple planes each including multiple blocks of multiple cells 116. Alternatively, each NVM memory location 112 may be a plane including multiple blocks of the cells 116. The cells 116 may be single-level cells, multi-level cells, triple-level cells, quad-level cells, and/or penta-level cells, for example. Other examples of NVM memory locations 112 are possible; for instance, each NVM memory location may be a block or group of blocks. Each NVM memory location may include one or more blocks in a 3-D NAND array. Each NVM memory location 112 may include one or more logical blocks which are mapped to one or more physical blocks. Alternatively, the memory and each NVM memory location may be implemented in other ways known to those skilled in the art. In certain aspects, if multiple instances of NVMs 110 are used in the same storage device 102, each NVM may be a different type relative to the types of other instances of NVM. In some examples, each instance of NVM may correspond to a particular one of the multiple interfaces 106. For example, a first interface may be used for communicating data and memory commands to a first NVM, and a second interface may be used for communicating data and memory commands to a second NVM. Thus, in some examples, each host interface 106 may a corresponding dedicated NVM 110. As shown, a single controller (e.g., controller 123) may provide interoperability between multiple interfaces and multiple NVMs.

The storage device 102 also includes a volatile memory 118 that can, for example, include a Dynamic Random Access Memory (DRAM) or a Static Random Access Memory (SRAM). In one example, the volatile memory 118 may be an SRAM internal to (or integrated into) controller 123 of the storage device 102, and/or the volatile memory 118 may be a DRAM external to (or remote from) controller 123 of the storage device 102.

The controller 123 may include a read-only memory (ROM) 117 for storing programming instructions and data. The ROM 117 may store boot or start-up code for the storage device 102. In addition, or as an alternative to the ROM 117 for start-up or boot code, a portion of the NVM 110 may be used for at least a portion of the boot code.

The memory (e.g., NVM 110) is configured to store data 119 received from the host device 104. The data 119 may be stored in the cells 116 of any of the NVM memory locations 112. As an example, FIG. 1 illustrates data 119 being stored in different NVM memory locations 112, although the data may be stored in the same NVM memory location. In another example, the NVM memory locations 112 may be different dies, and the data may be stored in one or more of the different dies.

Each of the data 119 may be associated with a logical address. For example, the volatile memory 118 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a physical address associated with each memory location 112 in the NVM where data is stored. While FIG. 1 illustrates a single L2P mapping table 120 stored in volatile memory 118, in other examples, the L2P mapping table 120 may include multiple tables stored in volatile memory 118. Mappings may be updated in the L2P mapping table 120 respectively in response to host writes, and periodically the L2P mapping table 120 may be flushed from volatile memory 118 to one or more of the NVM memory locations 112 of NVM 110 so that the mappings may persist across power cycles. In the event of a power failure in storage device 102, the L2P mapping table 120 in volatile memory 118 may be recovered during initialization from the L2P entries previously stored in NVM 110.

Figure 2:
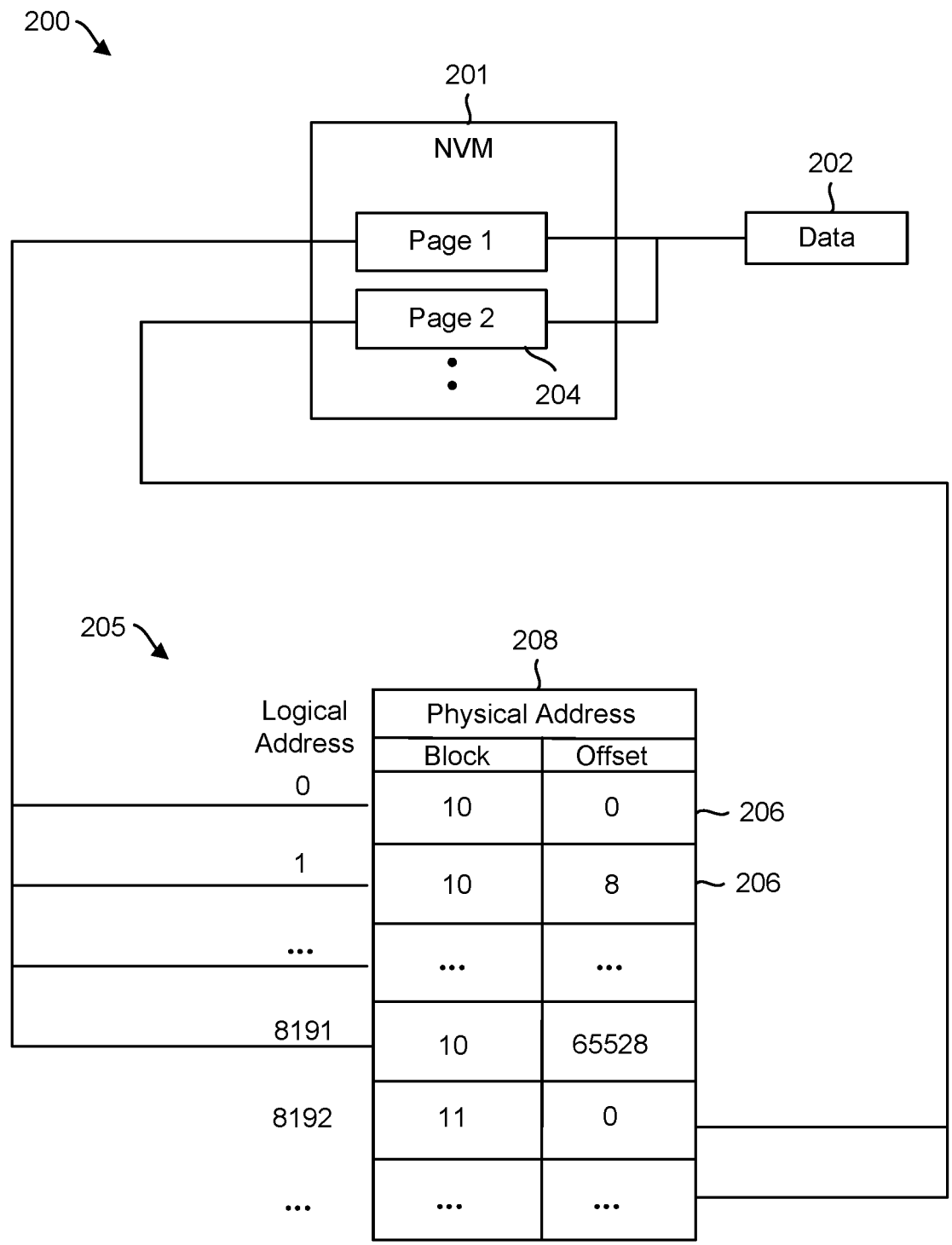
FIG. 2 is a conceptual diagram illustrating an example of a logical-to-physical (L2P) mapping table in a non-volatile memory of the storage device of FIG. 1.

FIG. 2 is a conceptual diagram 200 of an example of an L2P mapping table 205 stored in volatile memory (e.g., the volatile memory 118 of FIG. 1) illustrating the mapping of data 202 received from a host device to logical addresses and physical addresses in NVM 201 (e.g., the NVM 110 of FIG. 1). The data 202 may correspond to the data 119 in FIG. 1, while the L2P mapping table 205 may correspond to the L2P mapping table 120 in FIG. 1. In one example, the data 202 may be stored in one or more pages 204 (e.g., physical pages) in NVM 201. Each page 204 may be associated with a mapping set including one or more entries 206 of the L2P mapping table 205 respectively identifying a physical address 208 mapped to a logical address (e.g., a logical block address (LBA)) associated with the data written to the NVM. A logical page may include one or more of the entries 206. An LBA may be a logical address specified in a write command for the data received from the host device. Physical address 208 may indicate the block and the offset at which the data associated with an LBA is physically written, as well as a length or size of the written data (e.g., 4 KB or some other size). In the illustrated example, page 204 encompassing 32 KB of data 202 may be associated with a mapping set including 8192, 4 KB entries. However, in other examples, page 204 may encompass a different amount of host data (e.g., other than 32 KB of host data) or may include a different number of entries 206 (e.g., other than 8192 entries), or entries 206 may respectively include different host data lengths (e.g., other than 4 KB each).

Referring back to FIG. 1, the NVM 110 includes sense amplifiers 124 and data latches 126 connected to each NVM memory location 112. For example, the NVM memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the NVM memory location 112, the sense amplifiers 124 sense the data by amplifying the voltages on the bit lines to a logic level (e.g., readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the NVM memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a system on a chip (SoC), a Field Programmable Gate Array (FPGA), hard-wired logic, analog circuitry and/or a combination thereof.

The controller 123 is configured to receive data transferred from one or more of the cells 116 of the various NVM memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the volatile memory 118 when reading or writing data to the cells 116. For example, the controller 123 may receive logical-to-physical address mappings from the volatile memory 118 in response to read or write commands from the host device 104, identify the physical addresses mapped to the logical addresses identified in the commands (e.g., translate the logical addresses into physical addresses), and access or store data in the cells 116 located at the mapped physical addresses. The controller 123 is also configured to access the L2P mapping table 120 in the NVM 110, for example, following a power failure during initialization, to recover or populate the L2P mapping table 120 in the volatile memory 118.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a NVM memory location 112 in the NVM 110 of storage device 102 for storing the data. The controller 123 stores the L2P mapping in the L2P mapping table 120 to map a logical address associated with the data to the physical address of the NVM memory location 112 allocated for the data. The controller 123 then stores the data in the NVM memory location 112 by sending it to one or more data latches 126 connected to the allocated NVM memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the L2P mapping table 120 to translate the logical addresses specified in the read command to the physical addresses indicating the location of the data. The controller 123 then reads the requested data from the NVM memory location 112 specified by the physical addresses by sensing the data using the sense amplifiers 124 and storing them in data latches 126 until the read data is returned to the host 104 via the host interface 106.

Introduction to USB Drives

USB drives may come in various types and configurations, and their speed (e.g., data rate) and capacity can vary based on the technology and/or interface they use. Two factors that may determine the speed and/or capacity of a USB drive are the USB generation and the storage technology used.

USB technology has evolved over the years, resulting in different generations of USB ports and cables, each with varying data transfer speeds. USB generations include USB 1.0, USB 2.0, USB 3.0, USB 3.1, and USB 3.2. The higher the generation, the faster the data transfer rate. For example, USB 3.0 is faster than USB 2.0, and USB 3.1 is faster than USB 3.0. The capacity of a USB device may be based on the type of storage technology used, such as NAND flash memory. USB devices can come in various storage capacities, ranging from a few gigabytes to several terabytes.

Thus, it is possible to have USB drives with different combinations of USB data transfer speeds and capacities, as well as different physical interface configurations. For example, a USB drive with a large storage capacity, like 1 TB or more, might use older USB generation technology (e.g., USB 2.0) and thus may have slower data transfer speed. Such USB drives may be suitable for storing large amounts of data but might be slower when transferring data to and from the drive. In another example, USB drives with smaller storage capacities (e.g., 8 GB or 16 GB), may use faster USB generation technology (e.g., USB 3.0 or higher) to achieve faster data transfer rates. These devices may be suitable for quickly transferring smaller files.

USB drives may also use different physical interface configurations. For example, USB-A, USB-B, and USB-C relate to different types of USB connectors that in various styles and may be designed for specific purposes and applications. USB-A is the standard rectangular USB connector found on computers, chargers, and USB hubs. USB-A connectors are typically used to connect host devices like computers to peripheral devices like keyboards, mice, and flash drives. USB-B is a connector style that may be used in printers, scanners, external hard drives, and other peripheral devices. USB-B type connectors may have several variations, including USB-B, Mini-B, and Micro-B. USB-C is a relatively newer USB connector style that can support relatively faster data transfer speeds and alternate modes like DisplayPort and Thunderbolt. USB-C connectors may be found on many modern laptops, smartphones, tablets, and other peripheral devices. USB-C type connectors may also have several variations, including USB-C with Thunderbolt, Mini-C, and Micro-C.

Example of a Multi-Functional USB Drive

Figure 3:
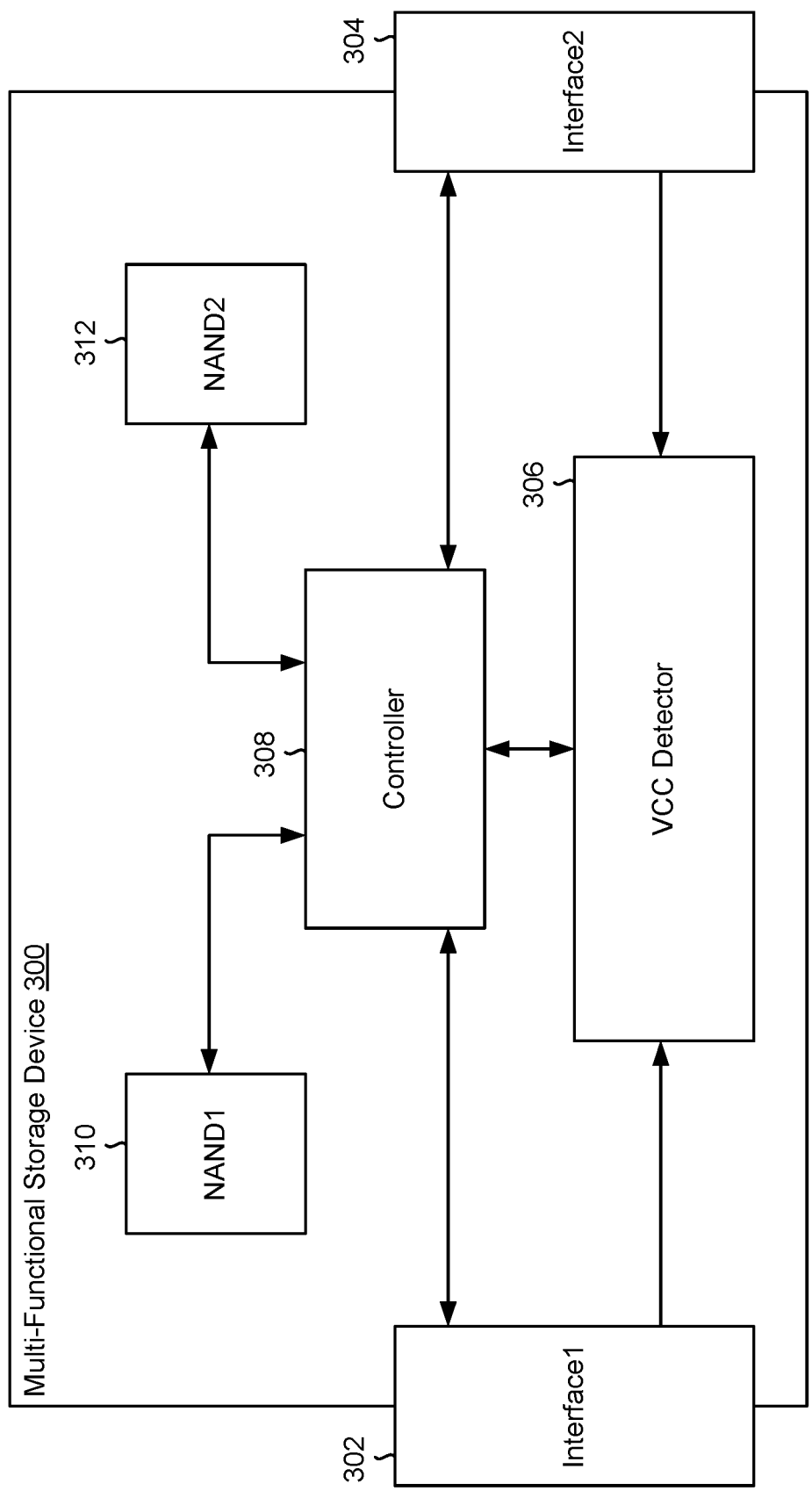
FIG. 3 is a block diagram of a multi-function USB device.

FIG. 3 is a block diagram conceptually illustrating an example of a multi-functional USB device 300 (e.g., storage device 102 of FIG. 1). The USB device 300 includes at least two interfaces: a first interface 302 and a second interface 304. The first interface 302 may correspond to a first NAND 310 (e.g., NVM 110), and the second interface 304 may correspond to a second NAND 312 (e.g., NVM 110). In other words, a user may use the first interface 302 (e.g., plug a host device into the first interface 302) to activate and use the first NAND 310, while using the second interface 304 to activate and use the second NAND 312. In certain aspects, each interface may only access one non-volatile memory element different from other memory elements accessible by other interfaces.

Each interface is also electronically coupled to a Vcc detector 306 configured to determine which interface is connected to a host device (e.g., host 104 of FIG. 1). For example, the Vcc detector 306 may detect that a power level has been introduced to the first interface 302 or second interface 304 when the corresponding interface is connected to a host device. Specifically, the Vcc detector 306 may detect a positive supply voltage provided by the host to the connected interface. The Vcc detector 306 may then signal an indication of which interface is powered to a controller 308. In some examples, the Vcc detector 306 may be implemented as a multiplexer or mux.

The controller 308 (e.g., controller 123 of FIG. 1) may be configured to manage various functions and operations of the USB drive, including data management (e.g., handling read/write commands of data to the flash memory within the USB device 300), error correction (e.g., error correction algorithms to detect and correct errors), wear leveling (e.g., evenly distributing write and erase operations across the memory cells, extending the overall lifespan of the flash memory), bad block management (e.g., tracking bad blocks and avoiding using them to store data), firmware management, USB communication, plug-and-play functionality, power management, etc.

The controller 308 may also be configured to activate a NAND associated with an interface that has been connected to a host. For example, the Vcc detector 306 may determine of which one of the first USB interface 302 and the second USB interface 304 is coupled to the host based on which interface receives power from the host. The controller 308 may then receive an indication from the Vcc detector 306 identifying which interface is coupled to the host based on the determination. The controller 308 may then activate (e.g., power on) the NAND memory associated with the powered interface. For example, if the first interface 302 is connected to a host, then the Vcc detector 306 may detect that the first interface 302 received voltage from the host. Accordingly, the Vcc detector 306 may provide the controller 308 with an indication that the first interface 302 is connected to a host. The controller 308 may then activate the first NAND 310 because the first NAND 310 is the memory that corresponds to the first interface 302. Similarly, if the second interface 304 is connected to the host, then the controller may activate the second NAND 312. The controller 308 may then proceed to execute host commands.

Figure 4:
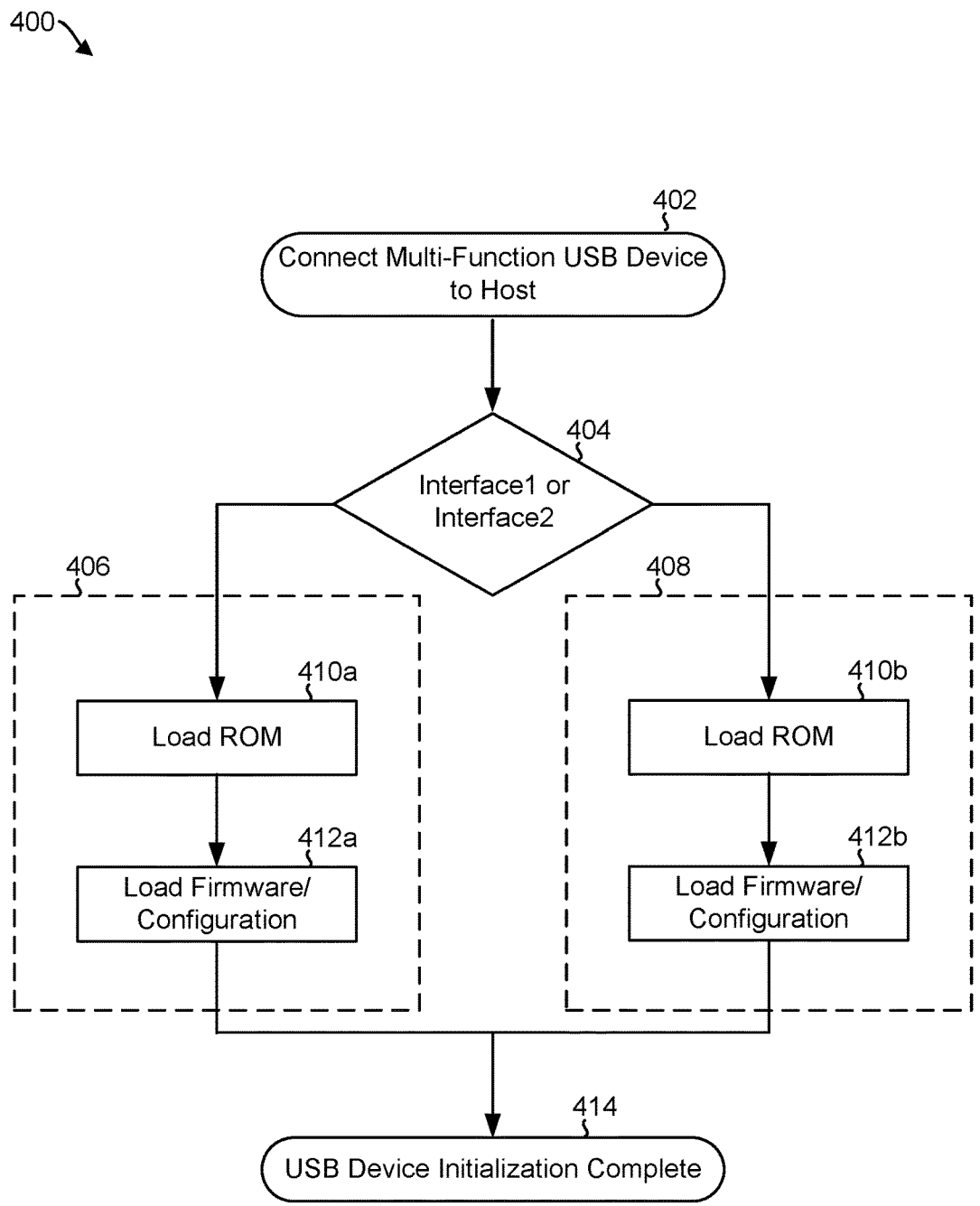
FIG. 4 is a flowchart illustrating an example of initializing the multi-function USB device illustrated in FIGS. 1 and 3.

FIG. 4 is a flow-chart conceptually illustrating an example technique for initialization 400 of a multi-function USB device (e.g., storage device 102 of FIG. 1; USB device 300 of FIG. 3). The techniques described herein may be performed by a combination of the first interface 302, the second interface 304, the Vcc detector 306, and the controller 308 of FIG. 3.

At a first block 402, a user may connect the multi-function USB device to a host (e.g., host 104 of FIG. 1). The host may provide power to the USB device via the USB interface used to connect to the host. At a second block 404, the Vcc detector may detect which interface of the USB device has received the power, and may provide an indication of the powered interface to the controller.

The controller may proceed to one of a third step 406 or a fourth step 408 depending on which NAND memory is associated with the powered interface. For example, if a first interface that corresponds to a first NAND receives host power, then the controller may proceed to the third step 406 where the controller performs a first sub-step 410a of accessing the ROM (e.g., ROM 117 of FIG. 1) and a second sub-step 412a of loading and execute firmware and/or software for the NAND memory that corresponds to the powered USB interface. Thus, the ROM may include firmware and/or software and other configuration information for each of the separate NAND memories on the USB device that the controller may use to manage the corresponding NAND memories.

Thus, if the first interface is powered by the host, then the controller may perform sub-steps 410*a* and 412*a*. However, if the second interface is powered by the host, then the controller may perform sub-steps 410*b* and 412*b*. It should be noted the ROM and firmware/configuration associated with the third step 406 may be different relative to the ROM and firmware/configuration of the fourth step 408. This is because a different interface may correspond to a different memory region (e.g., NAND1 or NAND2), a different speed (e.g., data rate), a different capacity, etc. Accordingly, the controller may load and execute firmware/software/configuration information associated with the NAND memory corresponding to the powered USB interface. In some examples, each NAND memory of the USB device may have its own firmware/software/configuration information stored on the ROM. In some examples, the controller may include multiple different ROM devices each corresponding to one or more different NAND memories.

The USB device initialization may complete at a fifth block 414, whereupon the controller may receive and execute memory instructions from the host using the NAND memory corresponding to the powered USB interface.

Figure 5:
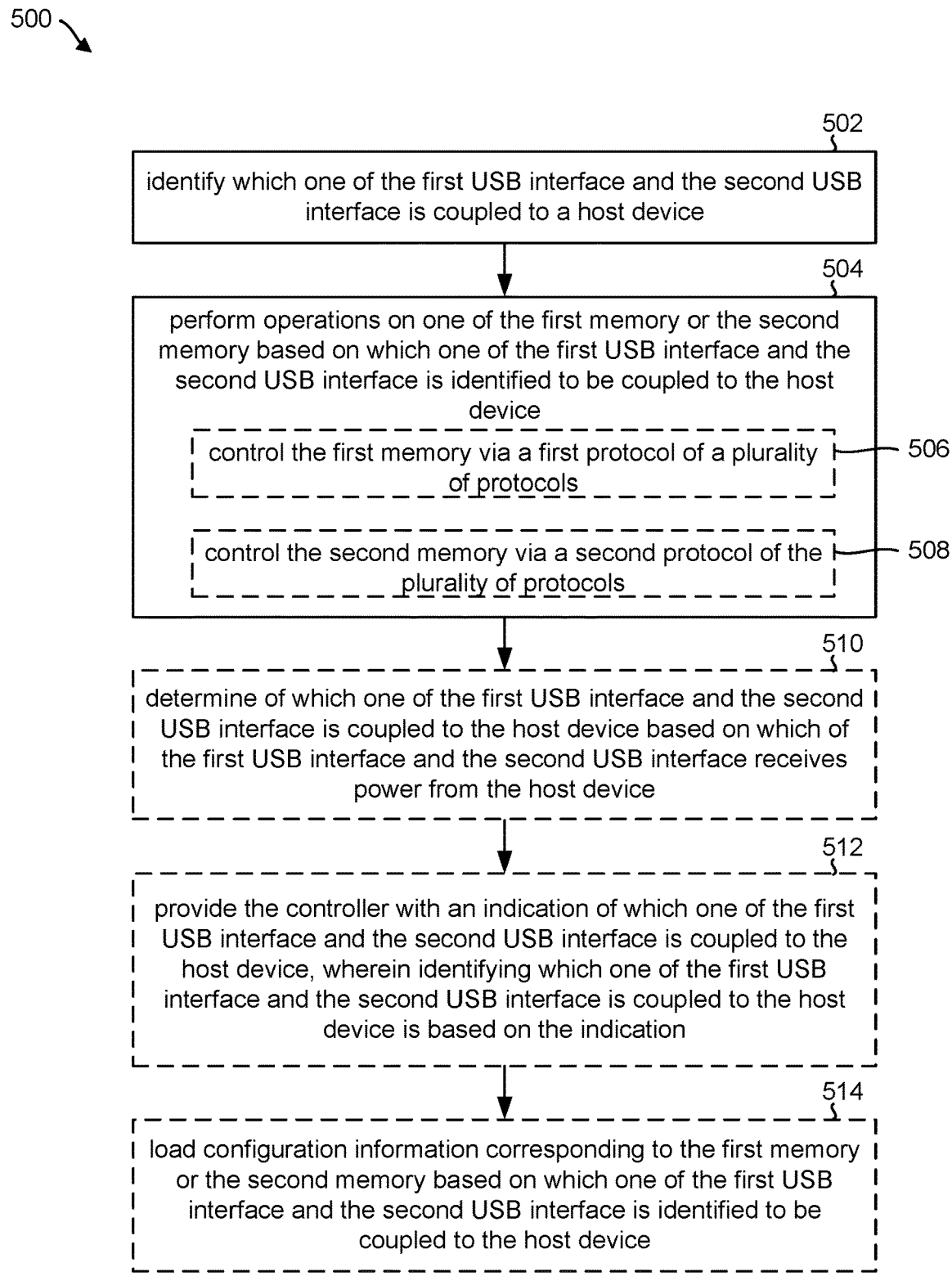
FIG. 5 is a flow diagram illustrating an example of a method storing data on the multi-function USB device illustrated in FIGS. 1 and 3.

FIG. 5 illustrates an example flow chart 500 of a method for using a multi-function USB device (e.g., storage device 102 of FIG. 1; USB device 300 of FIG. 3). Each of the steps in the flow chart can performed using the controller (e.g., controller 123 of FIG. 1; controller 308 of FIG. 3) and/or Vcc detector (e.g., Vcc detector 306 of FIG. 3), by a component or module of the controller, or by another suitable means.

As represented by block 502, the controller may identify which one of the first USB interface and the second USB interface is coupled to a host device. For example, the Vcc detector may detect a voltage applied to one of the first interface or the second interface. The Vcc detector may then provide the controller with an indication of which interface is powered. As such, the controller may activate the corresponding NAND memory and load the associated firmware/software/configuration information associated with the corresponding NAND memory.

As represented by block 504, the controller may perform operations on one of the first memory or the second memory based on which one of the first USB interface and the second USB interface is identified to be coupled to the host device. Here, based on which interface is powered by the host, the controller may activate and execute host memory commands on a corresponding NAND memory. For example, if the first interface is powered and corresponds to a first NAND memory, then the controller may activate and execute memory commands using the first NAND memory.

As represented by block 506, the controller may optionally control the first memory via a first protocol of a plurality of protocols. As represented by block 508, the controller may optionally control the first memory via a first protocol of a plurality of protocols. For example, the controller may store a protocol associated with each USB interface and corresponding NAND memory in a ROM, or in multiple ROMS.

As represented by block 510, the controller may optionally determine of which one of the first USB interface and the second USB interface is coupled to the host device based on which of the first USB interface and the second USB interface receives power from the host device. Here, the Vcc detector may determine which USB interface is receiving power from the host, and may provide an indication of the interface to the controller. This way, the controller is able to activate the NAND memory corresponding to the powered interface.

As represented by block 512, the Vcc detector may provide the controller with an indication of which one of the first USB interface and the second USB interface is coupled to the host device, wherein the controller may identify which one of the first USB interface and the second USB interface is coupled to the host device based on the indication.

As represented by block 514, the controller may load configuration information corresponding to the first memory or the second memory based on which one of the first USB interface and the second USB interface is identified to be coupled to the host device. Here, the controller may load firmware/software/configuration information for the NAND memory that corresponds to the powered interface.

In certain aspects, the first USB interface is configured to enable memory operations between the host device and the first memory, and the second USB interface is configured to enable memory operations between the host device and the second memory.

In certain aspects, the first memory is a first type of NAND memory, and wherein the second memory is a second type of NAND memory. For example, the NAND memory may be defined by one of a plurality of types including the first type and the second type, wherein the plurality of types includes a bit-column stacked (BiCS) type, a single-level cell (SLC) type, a multi-level cell (MLC) type, a triple-level cell (TLC) type, a quad-level cell (QLC) type, and a three-dimensional (3D) NAND type.

In certain aspects, the BiCS type comprises one of a BiCS3 type, a BiCS4 type, a BiCS6 type, or a BiCS8 type.

In certain aspects, the plurality of protocols comprise at least: a USB 1.0 protocol, a USB 2.0 protocol, a USB 3.0 protocol, a USB 3.1 protocol, a USB 3.2 protocol, and a USB 4.0 protocol.

In certain aspects, the first USB interface is one of a plurality of USB interfaces, and wherein the second USB interface is another of the plurality of USB interfaces.

In certain aspects, the plurality of USB interfaces comprises at least: a type-A interface, a type-B interface, a type-C interface, a mini-USB interface, and a micro-USB interface.

Figure 6:
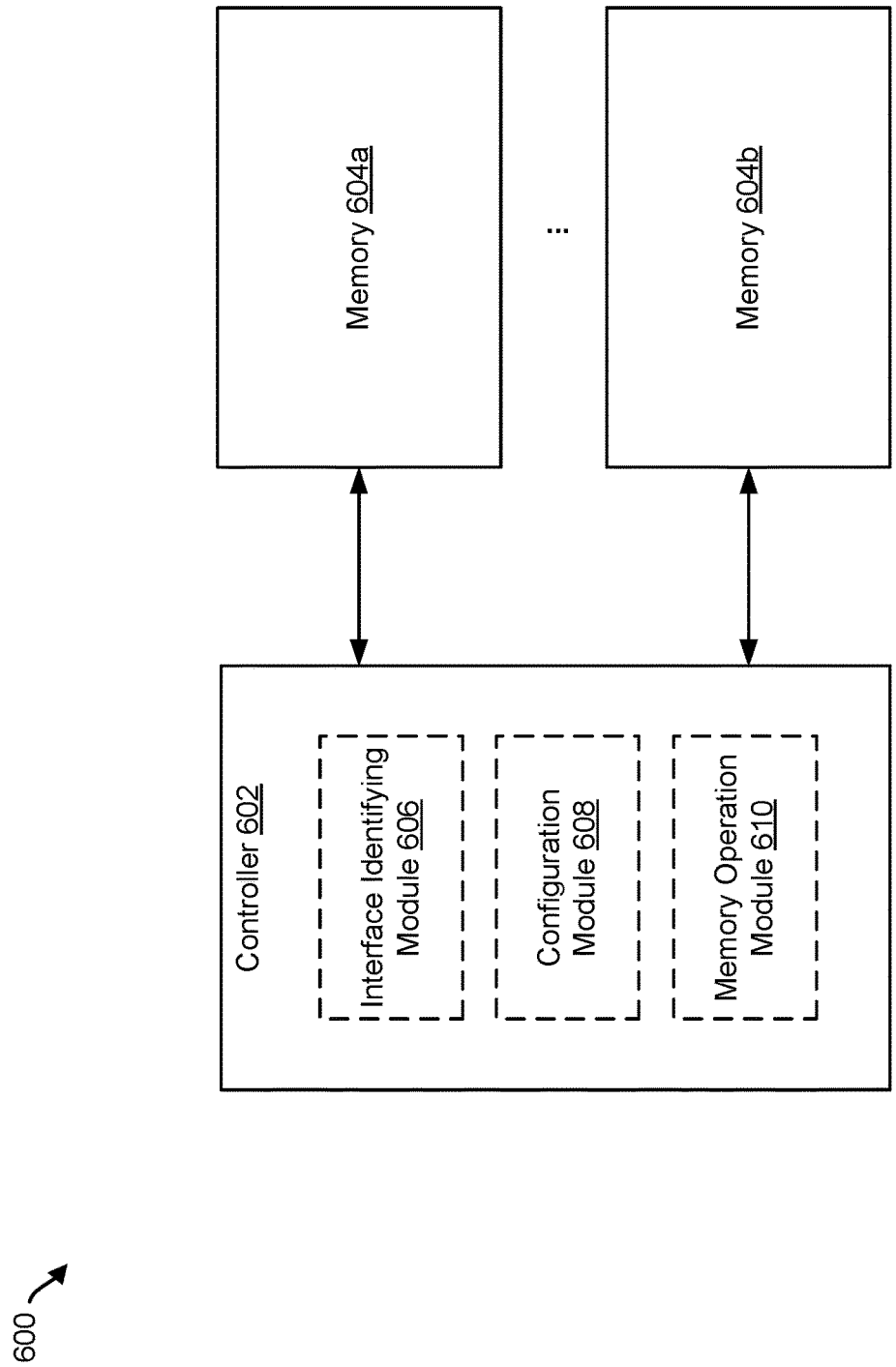
FIG. 6 is a conceptual diagram illustrating an example of a controller of the multi-function USB device illustrated in FIGS. 1 and 3.

FIG. 6 is a conceptual diagram illustrating an example 600 of a controller 602 coupled to a first memory 604*a* (e.g., a first NAND 310) and a second memory 604*b* (e.g., a second NAND 312) in a storage device (e.g., storage device 102 of FIG. 1; USB device 300 of FIG. 3). For example, controller 602 may correspond to controller 123 of FIG. 1 and controller 308 of FIG. 3. The first memory 604*a* and the second memory 604*b* may correspond to the NVM 110 of FIG. 1 and first NAND 310 and second NAND 312 of FIG. 3. The controller 602 may be implemented in software, hardware, or a combination of hardware and software. In one exemplary embodiment, the controller is implemented with several software modules executed on one or more processors, but as those skilled in the art will appreciate, the controller may be implemented in any suitable way. The skilled artisan will readily understand how best to implement the controller based on the particular design parameters of the system.

In certain aspects, the controller 602 includes an interface identifying module 606 that may provide a means for identifying which one of the first USB interface and the second USB interface is coupled to a host device; a means for determining of which one of the first USB interface and the second USB interface is coupled to the host device based on which of the first USB interface and the second USB interface receives power from the host device; and a means for receiving, from a Vcc detector, an indication of which one of the first USB interface and the second USB interface is coupled to the host device, wherein identifying which one of the first USB interface and the second USB interface is coupled to the host device is based on the indication. For example, the interface identifying module 606 may perform the process described above with respect to blocks 502, 510, and 512 of FIG. 5.

In certain aspects, the controller 602 includes a configuration module 608 that may provide a means for loading configuration information corresponding to the first memory or the second memory based on which one of the first USB interface and the second USB interface is identified to be coupled to the host device; means for controlling the first memory via a first protocol of a plurality of protocols; and means for controlling the second memory via a second protocol of the plurality of protocols. For example, the configuration module 608 may perform the process described above with respect to blocks 506, 508, and 514 of FIG. 5.

In one example, the controller 602 includes a memory operation module 610 that may provide a means for performing operations on one of the first memory or the second memory based on which one of the first USB interface and the second USB interface is identified to be coupled to the host device. For example, the memory operation module 610 may perform the process described above with respect to block 504 of FIG. 5.

Accordingly, a user may appreciate the multiple different USB interfaces, USB protocols, and/or USB memory types in a single package. Moreover, the ability of the controller to determine which memory to activate based on which USB interface is receiving power automates the process for the user so that the user does not have to manually select a particular memory.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a configuration memory;
a plurality of universal serial bus (USB) interfaces, including a first USB interface and a second USB interface;
a plurality of non-volatile memories including a first non-volatile memory and a second non-volatile memory, wherein the first non-volatile memory is a different type of memory relative to the second non-volatile memory, and wherein the first non-volatile memory is configured to communicate using a different protocol relative to the second non-volatile memory; and
a single controller coupled to the first non-volatile memory and the second non-volatile memory, the controller configured to:
identify a coupling status of the first USB interface and the second USB interface to a host device, wherein each of the first USB interface and the second USB interface is a physical USB connector separate from the other;
load configuration information from the configuration memory, the loaded configuration information corresponding to the first non-volatile memory and the second non-volatile memory based on the coupling status of the first USB interface and the second USB interface to the host device; and
perform operations, based on the coupling status and the configuration information, on one of the first non-volatile memory while the first USB interface is coupled to the host device, and the second non-volatile memory while the second USB interface is coupled to the host device.

2. The storage device of claim 1, further comprising a power detector configured to:
identify the coupling status of the first USB interface and the second USB interface based on which of the first USB interface and the second USB interface receives power from the host device.

3. The storage device of claim 2, wherein the power detector is further configured to:
provide the controller with an indication of which one of the first USB interface and the second USB interface is coupled to the host device, wherein identifying the coupling status of the first USB interface and the second USB interface is based on the indication.

4. The storage device of claim 1, wherein the first USB interface is configured to enable memory operations between the host device and the first non-volatile memory, and wherein the second USB interface is configured to enable memory operations between the host device and the second non-volatile memory.

5. The storage device of claim 1, wherein the first non-volatile memory is a first type of NAND memory, and wherein the second non-volatile memory is a second type of NAND memory.

6. The storage device of claim 5, wherein NAND memory is defined by one of a plurality of types including the first type and the second type, wherein the plurality of types includes a bit-column stacked (BiCS) type, a single-level cell (SLC) type, a multi-level cell (MLC) type, a triple-level cell (TLC) type, a quad-level cell (QLC) type, and a three-dimensional (3D) NAND type.

7. The storage device of claim 6, wherein the BiCS type comprises one of a BiCS3 type, a BiCS4 type, a BiCS6 type, or a BiCS8 type.

8. The storage device of claim 1, wherein the controller is further configured to:
control the first non-volatile memory via a first protocol of a plurality of protocols; and
control the second non-volatile memory via a second protocol of the plurality of protocols.

9. The storage device of claim 8, wherein the plurality of protocols comprises at least: a USB 1.0 protocol, a USB 2.0 protocol, a USB 3.0 protocol, a USB 3.1 protocol, a USB 3.2 protocol, and a USB 4.0 protocol.

10. The storage device of claim 1, wherein the first USB interface is one of a plurality of USB interfaces, and wherein the second USB interface is another of the plurality of USB interfaces.

11. The storage device of claim 10, wherein the plurality of USB interfaces comprises at least: a type-A interface, a type-B interface, a type-C interface, a mini-USB interface, and a micro-USB interface.

12. A method for storing data at a storage device, comprising:
 connecting one of a first universal serial bus (USB) interface or a second USB interface of the storage device to a host device, wherein the storage device comprises a plurality of USB interfaces including the first USB interface and the second USB interface, and a plurality of non-volatile memories including a first non-volatile memory corresponding to the first USB interface and a second non-volatile memory corresponding to the second USB interface, wherein each of the first USB interface and the second USB interface is a physical USB connector separate from the other, wherein the first non-volatile memory is a different type of memory relative to the second non-volatile memory, and wherein the first non-volatile memory is configured to communicate using a different protocol relative to the second non-volatile memory;
 detecting a coupling status of the first USB interface and the second USB interface to the host device;
 loading configuration information from a configuration memory, the loaded configuration information corresponding to the first non-volatile memory and the second non-volatile memory based on the coupling status of the first USB interface and the second USB interface to the host device; and
 performing operations, based on the coupling status and the configuration information, on the first non-volatile memory while the first USB interface is coupled to the host device, and the second non-volatile memory while the second USB interface coupled to the host device.

13. The method of claim 12, wherein the method further comprises:
 detecting that the first USB interface is coupled to the host device based on the first USB interface receiving power from the host device.

14. The method of claim 12, wherein the first USB interface is configured to enable memory operations between the host device and the first non-volatile memory, and wherein the second USB interface is configured to enable memory operations between the host device and the second non-volatile memory.

15. The method of claim 14, wherein the first non-volatile memory is a first type of NAND memory, and wherein the second non-volatile memory is a second type of NAND memory.

16. The method of claim 15, wherein NAND memory is defined by one of a plurality of types including the first type and the second type, wherein the plurality of types includes a bit-column stacked (BiCS) type, a single-level cell (SLC) type, a multi-level cell (MLC) type, a triple-level cell (TLC) type, a quad-level cell (QLC) type, and a three-dimensional (3D) NAND type.

17. The method of claim 16, wherein the BiCS type comprises one of a BiCS3 type, a BiCS4 type, a BiCS6 type, or a BiCS8 type.

18. A non-transitory, computer-readable medium comprising computer executable code, the code when executed by one or more processors causes the one or more processors to, individually or in combination:
 detect a coupling status of a first universal serial bus (USB) interface and a second USB interface of a storage device to a host device, wherein the storage device comprises a plurality of USB interfaces including the first USB interface and the second USB interface, wherein the first USB interface corresponds to a first non-volatile memory of a plurality of non-volatile memories, wherein the second USB interface corresponds to a second non-volatile memory of the plurality of non-volatile memories, and wherein each of the first USB interface and the second USB interface is a physical USB connector separate from the other, wherein the first non-volatile memory is a different type of memory relative to the second non-volatile memory, and wherein the first non-volatile memory is configured to communicate using a different protocol relative to the second non-volatile memory;
 load configuration information from a configuration memory, the loaded configuration information corresponding to the first non-volatile memory and the second non-volatile memory based on the coupling status of the first USB interface and the second USB interface to the host device; and
 perform operations, based on the coupling status and the configuration information, on the first non-volatile memory while the first USB interface is coupled to the host device, and the second non-volatile memory while the second USB interface is coupled to the host device.

* * * * *